United States Patent
Fujiyama et al.

(10) Patent No.: US 7,988,756 B2
(45) Date of Patent: Aug. 2, 2011

(54) GAS-SOLID SEPARATOR

(75) Inventors: Yuichiro Fujiyama, Yokohama (JP); Toshiaki Okuhara, Yokohama (JP); Shigeko Okuhara, legal representative, Fujisawa (JP)

(73) Assignees: Japan Cooperation Ctr., Petroleum, Tokyo (JP); Nippon Oil Corporation, Tokyo (JP)

( * ) Notice: Subject to any disclaimer, the term of this patent is extended or adjusted under 35 U.S.C. 154(b) by 18 days.

(21) Appl. No.: 12/373,072

(22) PCT Filed: Jul. 5, 2007

(86) PCT No.: PCT/JP2007/063451
§ 371 (c)(1),
(2), (4) Date: Jan. 13, 2010

(87) PCT Pub. No.: WO2008/007602
PCT Pub. Date: Jan. 17, 2008

(65) Prior Publication Data
US 2010/0186356 A1 Jul. 29, 2010

(30) Foreign Application Priority Data
Jul. 12, 2006 (JP) ................................. 2006-192081

(51) Int. Cl.
*B04C 3/00* (2006.01)
(52) U.S. Cl. ................ 55/452; 55/440; 55/441; 55/442; 55/443; 55/444; 55/498; 55/459.3; 55/447; 55/456; 55/337; 55/427; 55/426; 55/529; 55/DIG. 30

(58) Field of Classification Search ............ 55/440–444, 55/498, 447–465, 337, DIG. 30, 427, 426, 55/529
See application file for complete search history.

(56) References Cited

U.S. PATENT DOCUMENTS
3,992,172 A 11/1976 Clark
(Continued)

FOREIGN PATENT DOCUMENTS
JP 59590 9/1921
(Continued)

OTHER PUBLICATIONS

Y. Fujiyama, "Development of HS-FCC (high-severity fluid catalytic cracking) Technology," Nisski Review, vol. 42, No. 2, pp. 6-12 (2000).

*Primary Examiner* — Jason M Greene
*Assistant Examiner* — Dung Bui
(74) *Attorney, Agent, or Firm* — Finnegan, Henderson, Farabow, Garrett & Dunner, LLP.

(57) ABSTRACT

A gas-solid separator has: an inner cylinder 10 having a closed lower end 11 and an opened upper end 1, and extending in a vertical direction; and an outer cylinder 2 that coaxially covers the inner cylinder 10 from the outside and has a gas vent port 6 formed on the upper end side of the inner cylinder and communicating with an exterior, wherein a plurality of axially extending long holes 4 are formed on a side surface on the lower end 11 side of the inner cylinder 10 in a circumferential direction, one of long side edge parts of each of the long holes 4 is provided with a guide blade 5 that protrudes outward and is inclined circumferentially so as to cover the long hole 4, and a part between the long holes 4 of the inner cylinder 10 is concaved in a center direction of the inner cylinder 10.

4 Claims, 7 Drawing Sheets

U.S. PATENT DOCUMENTS

| | | | |
|---|---|---|---|
| 4,322,233 A * | 3/1982 | Sisk | 55/426 |
| 5,487,769 A * | 1/1996 | Hutchinson et al. | 55/442 |
| 5,496,394 A * | 3/1996 | Nied | 95/271 |
| 6,146,597 A | 11/2000 | Nishida et al. | 422/147 |
| 6,376,732 B1 * | 4/2002 | Ngan et al. | 585/800 |
| 6,485,536 B1 * | 11/2002 | Masters | 55/337 |
| 6,613,116 B2 * | 9/2003 | Oh | 55/413 |
| 6,666,338 B1 * | 12/2003 | Henriksson et al. | 209/725 |
| 6,797,026 B2 * | 9/2004 | Sechrist et al. | 55/348 |
| 6,810,557 B2 * | 11/2004 | Hansen et al. | 15/353 |
| 6,857,165 B2 * | 2/2005 | Oh | 15/353 |
| 7,169,201 B2 * | 1/2007 | Oh et al. | 55/343 |
| 7,381,235 B2 * | 6/2008 | Koene et al. | 55/394 |
| 7,594,942 B2 * | 9/2009 | Polderman | 55/321 |
| 7,691,161 B2 * | 4/2010 | Oh et al. | 55/337 |
| 7,708,789 B2 * | 5/2010 | Fester | 55/337 |
| 7,722,693 B2 * | 5/2010 | Yoo et al. | 55/345 |
| 7,731,771 B2 * | 6/2010 | Lee et al. | 55/343 |
| 7,744,668 B2 * | 6/2010 | Oh et al. | 55/343 |
| 7,763,090 B2 * | 7/2010 | Gomiciaga-Pereda et al. | 55/459.1 |
| 7,780,753 B2 * | 8/2010 | Lang | 55/337 |
| 2009/0013658 A1 * | 1/2009 | Borgstrom et al. | 55/447 |

FOREIGN PATENT DOCUMENTS

| | | |
|---|---|---|
| JP | 25-416 | 2/1950 |
| JP | 46-37992 | 11/1971 |
| JP | 48-27476 | 4/1973 |
| JP | 48-79583 | 9/1973 |
| JP | 51-115373 | 10/1976 |
| JP | 3-135461 | 6/1991 |
| JP | 10-249121 | 9/1998 |
| JP | 10-249122 | 9/1998 |

* cited by examiner

Fig.5
(a) 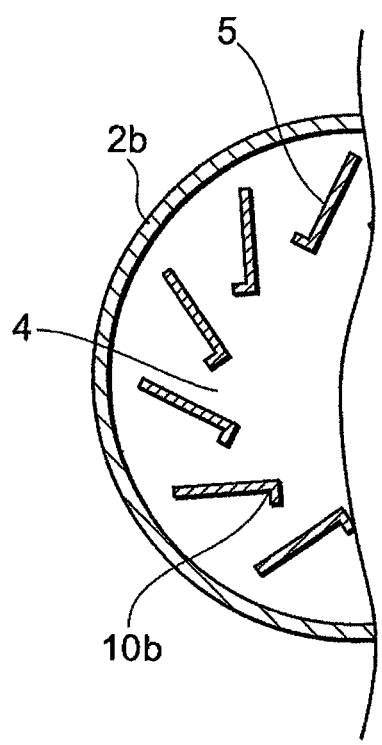
(b) 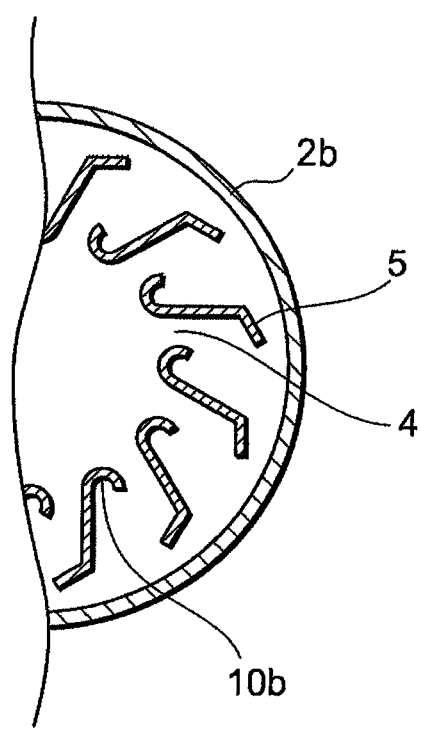

Fig.7

| | | | EXAMPLE | COMPARATIVE EXAMPLE |
|---|---|---|---|---|
| SIZE OF SEPARATOR | SHAPE OF GUIDE BLADES | | QUARTER CIRCLE | QUARTER CIRCLE |
| | INNER CYLINDER DIAMETER | mm  D3 | 1800 | 1800 |
| | CENTRAL OUTER CYLINDER DIAMETER | mm  D1 | 3450 | 3450 |
| | CENTRAL OUTER CYLINDER LENGTH | mm  La | 1450 | 1450 |
| | PARTICLE VENT TUBE DIAMETER | mm | 2400 | 2400 |
| | LONG HOLE VERTICAL LENGTH | mm  L | 1100 | 1100 |
| | LONG HOLE WIDTH | mm  W | 200 | 200 |
| | CONCAVED PARTS | | PRESENT (SEMICIRCULAR CROSS SECTIONAL-SHAPE, INTEGRATED WITH GUIDE BLADE INTO S-SHAPE) | ABSENT |
| | CONCAVED PART CROSS-SECTIONAL AREA (ONE) | mm²  10b | 1600 | 0 |
| | NUMBER OF LONG HOLES (GUIDE BLADES) | | 12 | 12 |
| | INCREASE RATE OF CROSS-SECTIONAL AREA | | 1.25 | 1 |
| | CONICAL CYLINDER CONE ANGLE | | 60 | 60 |
| | GAS SUPPLY AMOUNT | m³/h | 111362 | 111362 |
| | CATALYST SUPPLY AMOUNT | kg/min | 72875 | 72875 |
| | LONG HOLE PASSING GAS LINEAR VELOCITY | m/s | 11.7 | 11.7 |
| | OUTER CYLINDER RISING GAS LINEAR VELOCITY | m/s | 4.3 | 4.7 |
| | CATALYST COLLECTION | % | 72.0 | 66.0 |

GAS-SOLID SEPARATOR

CROSS-REFERENCE TO RELATED APPLICATIONS

This application is a national phase application of International Application No. PCT/JP2007/063451, filed Jul. 5, 2007, and claims the priority of Japanese Application No. 2006-192081, filed Jul. 12, 2006, the contents of both of which are incorporated herein by reference.

TECHNICAL FIELD

The present invention relates to a gas-solid separator for separating a mixture of solid particles and gas, into solid particles and gas.

BACKGROUND ART

A reaction system in which a particulate solid matter used as a catalyst or a heat medium is brought into contact with a reactant has conventionally been known. Some of the fluidized bed reactors functioning as this reaction system use a dense fluidized bed (bubble fluidized bed) or a high-speed moving bed (high-speed fluidized bed). The high-speed moving bed is used in a reaction that needs to reduce the time during which the solid particles are in contact with the gas (short contact time reaction). Nowadays, an upflow type high-speed moving bed reactor called "riser" has prevailed in fluid catalytic cracking units for producing gasoline using heavy oil or the like as stock oil. This is because the contact time was reduced as the catalytic performance improved, which enhanced the selectivity of the products including gasoline and prevented the occurrence of an unnecessary excessive decomposition reaction.

In the high-speed moving bed reactor, a mixture of a product gas and a particulate solid catalyst flows out of a reactor exit, and how the particulate solid catalyst can be separated promptly from the mixture is the critical issue of this type of device requiring a short contact time reaction. Therefore, the performance of the separator is very important.

The ones described in, for example, Patent Documents 1 to 3 are known as the above gas-solid separator.

Patent Document 1: Japanese Patent Application Publication No. H10-249122

Patent Document 2: U.S. Pat. No. 6,146,597

Patent Document 3: Japanese Patent Application Publication No. H10-249121

DISCLOSURE OF THE INVENTION

Problem to be Solved by the Invention

However, it turned out that the conventional gas-solid separator lacks in separation efficiency. The present invention was therefore contrived in view of the above problems, and an object thereof is to provide a gas-solid separator that has even higher efficiency of separating gas and a solid matter than the conventional gas-solid separator.

Means for Solving the Problem

A gas-solid separator according to the present invention has: an inner cylinder having a closed lower end and an opened upper end and extending in a vertical direction; and an outer cylinder that coaxially covers the inner cylinder from the outside and has a gas vent port formed on the upper end side of the inner cylinder and communicating with an exterior, wherein a plurality of axially extending long holes are formed on a side surface on the lower end side of the inner cylinder in a circumferential direction, and one of long side edge parts of each of the long holes is provided with a guide blade that protrudes outward and is inclined circumferentially so as to cover the long hole. A part between the long holes of the inner cylinder is concaved in a center direction of the inner cylinder.

According to the present invention, a mixture of solid particles and gas is supplied downward from an opening of the inner cylinder and then discharged downward from each long hole of the inner cylinder into the outer cylinder. The discharged gas slightly swirls along inner surfaces of the guide blades, and further proceeds downward. Here, some of the solid particles within the mixture collide with the inner surfaces of the guide blades and directly fall downward along the inner surfaces of the guide blades. The direction of the gas including the rest of the solid particles is inverted to an upward direction due to the gas vent port provided in an upper part of the outer cylinder. The gas consequently flows upward along an outer surface of the guide blade provided to the edge part of the adjacent long hole and is thereafter discharged from the gas vent port. When the downward direction of the gas flow is inverted to the upward direction, the solid particles accompanied with the gas are separated from the gas due to their inertia or deadweight and descend mainly along an inner wall while being swirled downward.

Particularly, in the present invention the part between the long holes of the inner cylinder is concaved in the center direction of the inner cylinder. For this reason, the horizontal cross-sectional area is increased as the inverted flow of gas rises, the ascent velocity of the gas is slowed down, and therefore it can be suppressed that the gas rises along with the solid particles. Therefore, the separation efficiency can be improved significantly.

Here, it is preferred that the concaved part be formed along at least 50% of the vertical length of the long holes. Accordingly, the effect of improving the separation efficiency can be enhanced.

It is also preferred that the concaved part be formed at least on the lower side between the long holes. Because the flow of gas is inverted in this lower side section, the effect of improving the separation efficiency is enhanced.

It is also preferred that have an arcuate cross-section as viewed in an axial direction of the inner cylinder. Accordingly, the concaved part can be connected with the guide blades smoothly and the flow of gas can be prevented from being disturbed unnecessarily.

Effects of the Invention

The present invention provides a gas-solid separator that has even higher efficiency of separating gas and a solid matter than to the conventional gas-solid separator.

BRIEF DESCRIPTION OF THE DRAWINGS

FIG. 5 is a cross-sectional view showing a modification of the guide blades shown in FIG. 3, wherein (a) shows flat guide blades and (b) bent guide blades;

FIG. 7 is a table showing the conditions and results obtained in an example and a comparative example.

EXPLANATION OF REFERENCE NUMERALS

Figure 1:
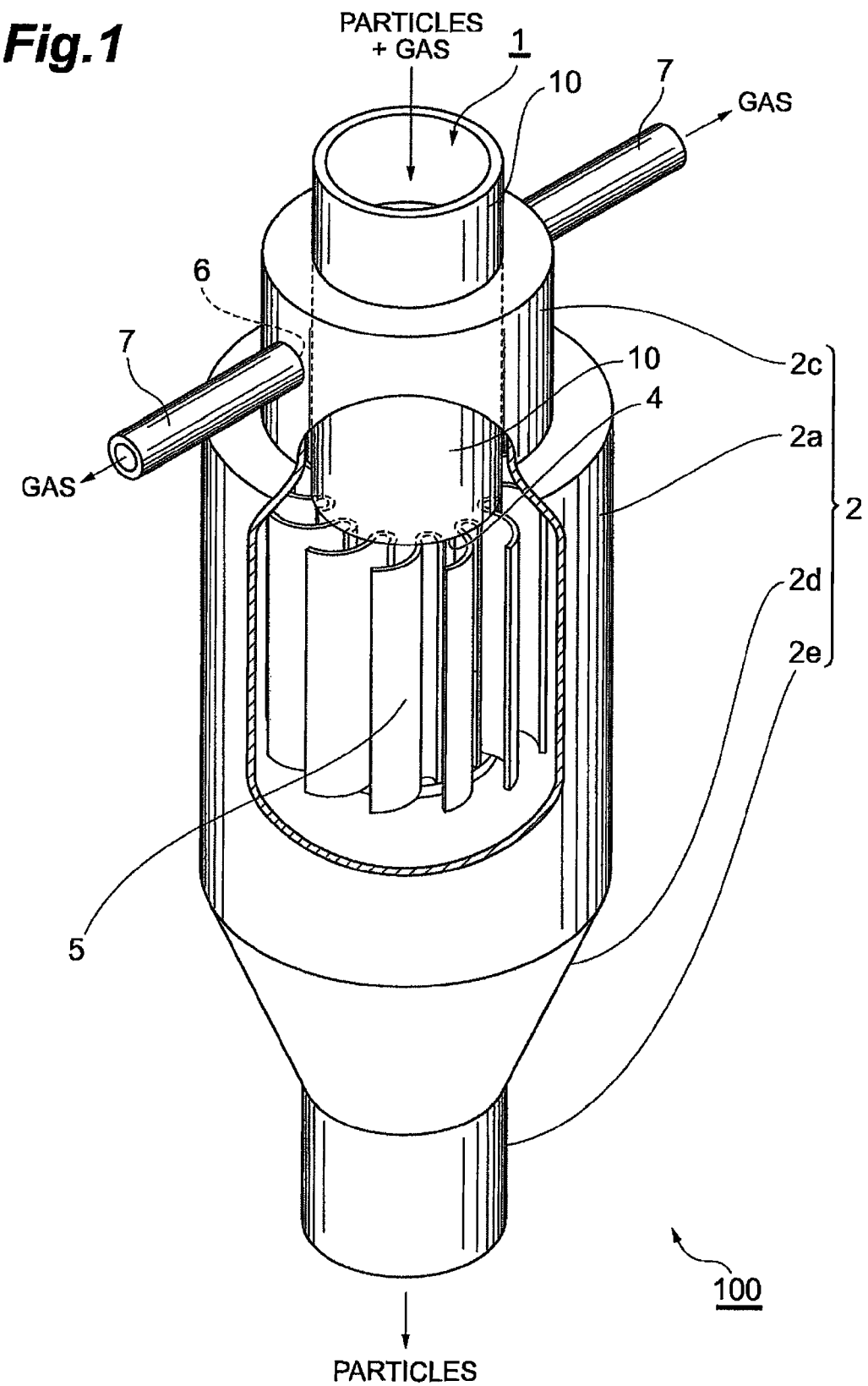
FIG. 1 is a partial broken perspective view of a gas-solid separator according to a first embodiment.

2 ... Outer cylinder
2a ... Central outer cylinder
3 ... Particle vent port
4 ... Long hole
5 ... Guide blade
6 ... Gas vent port
10 ... Inner cylinder
100, 102 ... Gas-solid separator

BEST MODE FOR CARRYING OUT THE INVENTION

First Embodiment

The present invention is now described hereinafter in detail with reference to the drawings. FIGS. 1 to 4 show one aspect of a gas-solid separator according to the first embodiment, FIG. 1 showing a partial broken perspective view, FIG. 2 a longitudinal cross-sectional view of the gas-solid separator of FIG. 1, FIG. 3 a cross-sectional view taken along the plane III-III of the gas-solid separator, and FIG. 4 a perspective view showing a flow in the vicinity of guide blades.

A gas-solid separator 100, configured into a substantially cylindrical double structure mounted coaxially in a fixed condition with mainly an inner cylinder 10 and an outer cylinder 2 serving as an envelope, is used in a vertically extended position.

(Inner Cylinder)

The vertically extending inner cylinder 10 having a bottomed cylindrical shape has an inlet 1 formed at its opened upper end, and a mixture of particles and gas is fed from this inlet 1. A lower end of the inner cylinder 10 is sealed by a bottom plate 11.

With regard to the size of the inner cylinder 10, an outer diameter D3 thereof is preferably the same as that of an unshown mixture transfer tube connected directly to the upstream side. However, the outer diameter D3 may be reduced or increased in order to obtain appropriate linear velocity of the mixture passing through the inner cylinder 10. Specifically, it is preferred that the diameter of the inner cylinder be determined such that the mixture linear velocity of the inner cylinder 10 becomes 3 to 30 m/s or preferably 10 to 20 m/s.

On a side surface of the bottom plate 11 of the inner cylinder 10, a plurality of axially extending long holes (slits) 4 having a narrow rectangular shape (twelve of them in the diagram) are formed at circumferentially equally spaced parts.

The opening area of each long hole 4 is determined such that the linear velocity of the mixture passing through the long hole 4 becomes 1 to 50 m/s, preferably 3 to 30 m/s, or more preferably 5 to 15 m/s, depending on the amount of mixture supplied. Once the area of the long hole 4 is determined, the width W and the length L of the long hole 4 can be determined accordingly. The linear velocity of less than 1 m/s is not preferred because the linear velocity of the mixture passing though the long hole 4 slows down and gas-solid separation cannot be performed sufficiently. The linear velocity of more than 50 m/s is also not preferred because the long hole 4, guide blade 5 and side wall of the outer cylinder 2 become worn dramatically.

The practical width W of the long hole 4 in the horizontal direction is expressed in the following equations where L1 represents the circumferential length of the inner cylinder 10.

Width $W$ of slit=3 mm to $L1/4$, or preferably $W=L1/16$ to $L1/64$

Moreover, the practical vertical length L of the long hole 4 is expressed in the following equation where La represents the height of a central outer cylinder 2a, which is described hereinafter.

Length $L$ of slit=$La \times a$, where $a$ is 0.1 to 0.99 or preferably 0.7 to 0.95.

Figure 3:
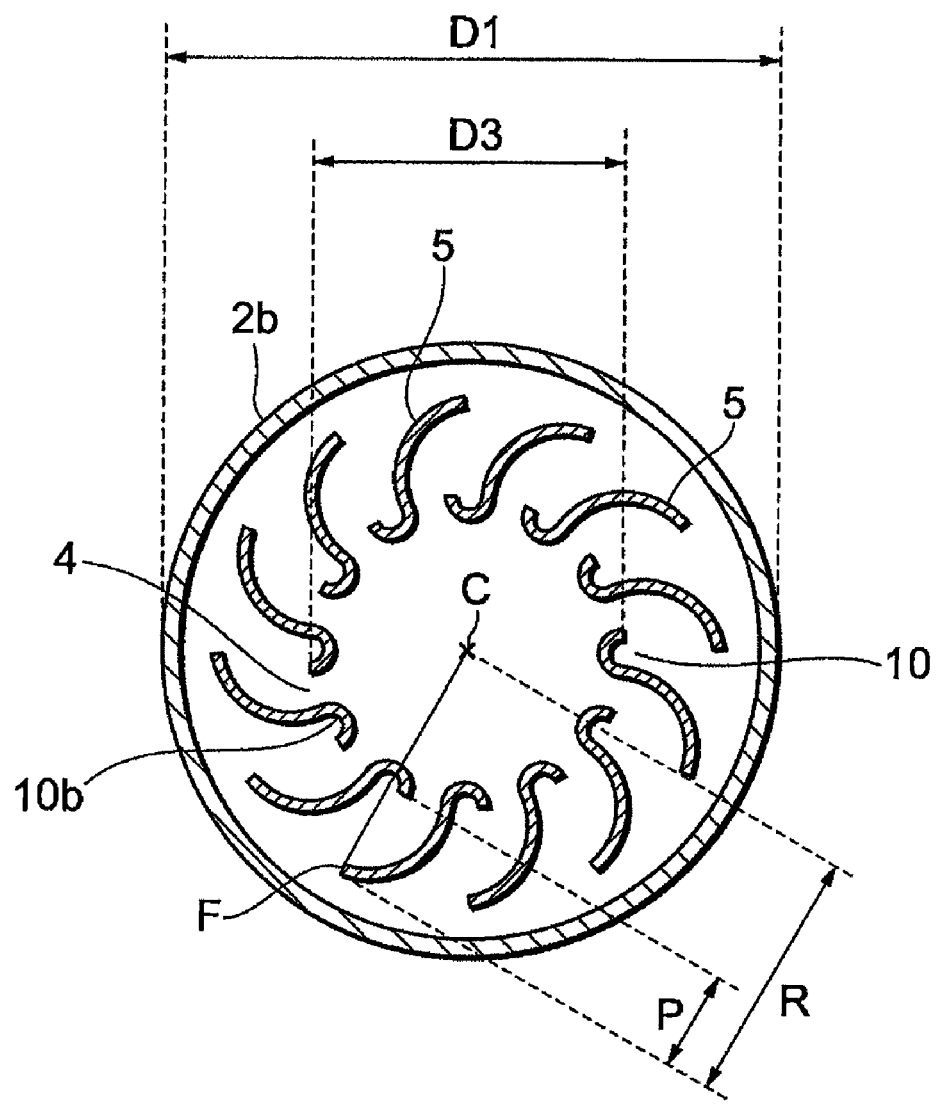
FIG. 3 is a cross-sectional view taken along the line of FIG. 2.

One of long side edge parts of each of the long holes 4 is provided with the long curved-plate like guide blade 5 protruding outward. Specifically, the guide blades 5 are provided as many as the long holes 4 along the long side edge parts of the respective long holes 4. Each of these guide blades 5 forms a fixed angle with a radial direction of the inner cylinder. In other words, each of the guide blades 5 is provided at a tilt in a fixed circumferential direction, so as to cover each long hole 4. The inclination may be curved as shown in FIGS. 1 and 3, flat as shown in the cross-sectional view of (a) of FIG. 5, or partially bent plate-like as shown in (b) of FIG. 5. In the case of the curved inclination, the curved surface where the side facing the long hole 4 is concaved as shown in FIG. 3, particularly an arcuate cross-section, is preferred. When the inclination has the arcuate cross-section, the apex angle is preferably 70 to 120 degrees with radius r, and $0.4 \times (D2-D3) \leq r \leq 0.5 \times (D2-D3)$ is preferably established, where the outer diameter of the inner cylinder 10 is D3 and an inner diameter of the central outer cylinder 2a is D2.

Radial direction protruding length P of each guide blade 5 (see FIG. 3), i.e. ((Distance R between the center C of the inner cylinder 10 and a leading end F of the guide blade 5)–0.5×Outer diameter D3 of the inner cylinder 10), is preferably set by the following equation, where the inner diameter of the central outer cylinder 2a is D2.

It is preferred that all of the guide blades 5 be formed into the same shape and positioned at circumferentially equally spaced parts in order to obtain a smooth operation in the entire separator. Note that the guide blades 5 with a plurality of divided configurations may be provided to a single long hole 4.

Protruding length $P$ of guide blade=$(R-0.5 \times D3)=0.5 \times (D2-D3) \times b$, where $b$ is 0.2 to 0.99 or preferably 0.7 to 0.95.

When b is smaller than 0.2, that is, when the value of the radial direction protruding length P of each guide blade 5 is excessively small, the flow of gas ejected from the long holes 4 cannot be inverted accurately. When b is larger than 0.99, that is, when the value of the radial direction protruding length P of the guide blade is excessively large, the gap between the outer cylinder and the guide blade becomes excessively small, which brings the guide blade into contact with the outer cylinder.

It is preferred that the vertical length of the guide blade 5 be approximately equal to the vertical length L of each long hole 4 and can be defined as follows.

Minimum height of guide blade 5=Length L of long hole 4/2

Maximum height of guide blade 5=Length of outer cylinder 2

Preferably, the vertical length of the guide blade 5 is at least the length L of long hole 4 or equal to 0.8×length of outer cylinder 2.

The number of long holes 4 is twelve in the illustrated examples but is not limited to this and thus may be two or more. It is preferred that the number of long holes 4 be eight to sixteen, or more preferably ten to fourteen. When there is only a single long hole 4 (less than two), inconvenience is caused because the gas flow inversion required for performing separation in the gap between the inner and outer cylinders cannot be achieved. In addition, although depending on the size of the inner cylinder 10, such as its diameter, even when more than sixteen long holes are provided, the separator becomes unnecessarily complicated and expensive. Therefore, no significant improvement in the separation efficiency is confirmed. The number of long holes 4 is obtained as a result of comprehensive judgment by analyzing an experimental result where the mixture is used in a fluid catalytic cracking unit for producing gasoline using heavy oil or the like as stock oil. The number of long holes in the present structure has a direct influence on a required separation efficiency and is preferably tested eventually through experiment in consideration of the opening area or the like.

For example, consider a case in which the linear velocity of the mixture passing through the inner cylinder is constant. In this case, i) when the number of long holes is the same, reducing the opening area of each long hole and increasing the linear velocity of the mixture passing through the long hole increase the change in velocity as a result of inverting the gas flow by increasing, thereby improving the separation efficiency. However, the adverse effect is that erosion accelerates. ii)

When the linear velocity from the long holes is the same, reducing the opening area per long hole and increasing the number of long holes 4 allows to obtain stable velocity inversion throughout the entire separator, thereby improving the separation efficiency. However, the adverse effect is that the separator becomes complicated. In consideration of the above facts, the number of holes is determined eventually by an experimental result using the mixture by comprehensively determining the required separation efficiency, the degree of erosion, complexity of the separator, and the like.

Figure 4:
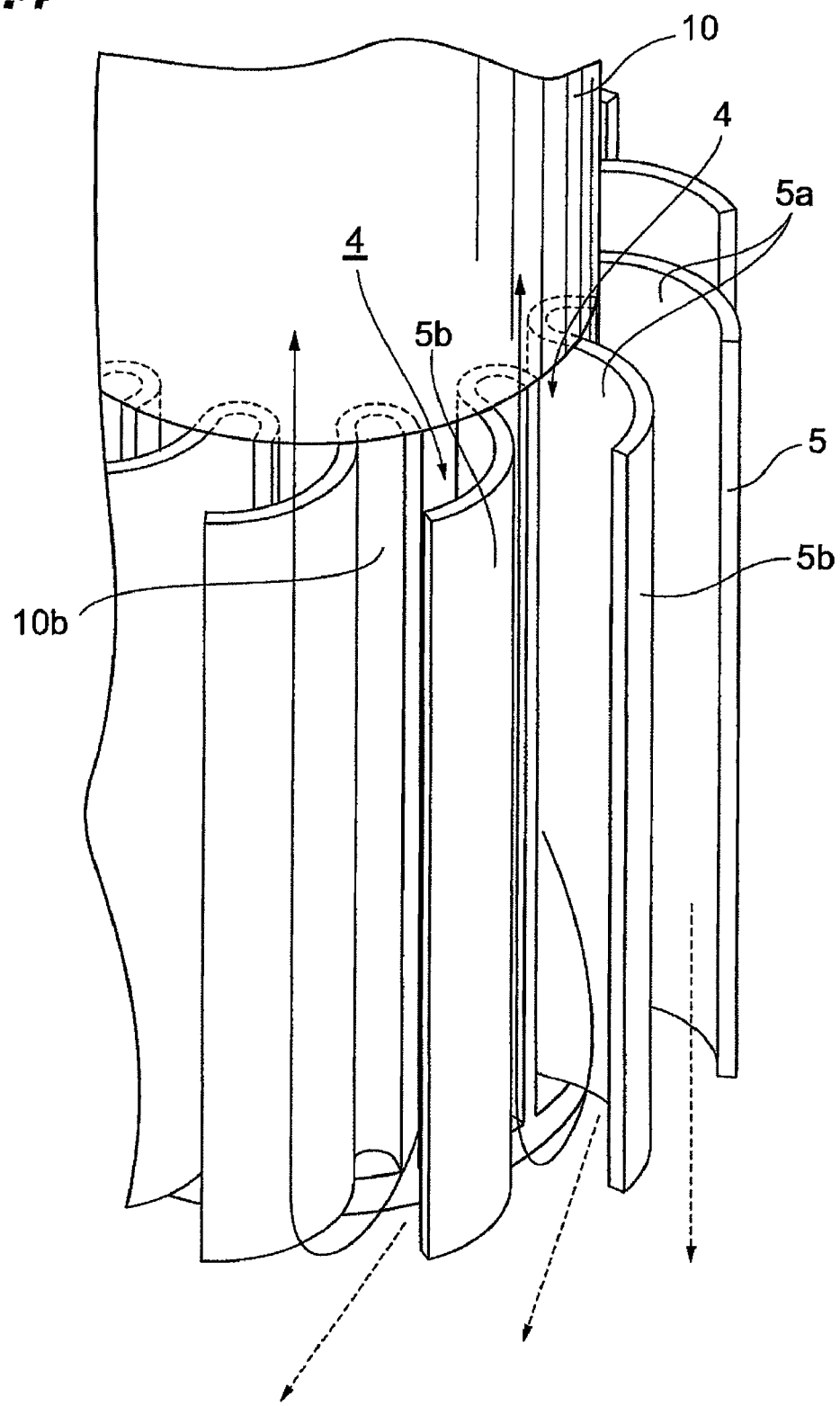
FIG. 4 is an enlarged perspective view showing the vicinity of guide blades shown in FIG. 1.

In addition, in the present embodiment a concaved part 10b that is concaved in the center direction of the inner cylinder 10 is formed between the long holes 4 of the inner cylinder 10, as shown in FIGS. 3 and 4.

Specifically, in the present embodiment the concaved part 10b extends in the vertical direction with respect to the vertical length L of each long hole 4, but it is particularly preferred that the concaved part 10b be formed along at least 50% of the length L of the long hole 4. It is also preferred that the concaved part 10b be formed at least on the lower side between the long holes 4.

Especially in the present embodiment, the concave part 10b is formed such that the wall of the inner cylinder 10 is bent in the form of an arcuate cross-section in the center direction of the inner cylinder, as viewed in an axial direction of the inner cylinder. Moreover, each guide blade 5 and the concaved part 10b are integrally formed into an S-shaped cross-section as viewed in the vertical direction. Note that the patterns of the concaved part are not particularly limited, and thus the concaved part may have a bent cross-sectional shape, as shown in (a) of FIG. 5.

The concaved part 10b is preferably formed such that the cross-sectional area thereof between the inner cylinder 10 and the central outer cylinder 2a becomes approximately 101% to 140% based on the cross-sectional area between the inner cylinder 10 and the central outer cylinder 2a without a concaved part. It is also preferred that the concaved part 10b be provided between the long holes 4 in the circumferential direction in the same manner.

(Outer Cylinder)

The outer cylinder 2 is a cylindrical body that covers the inner cylinder 10 from the outside and is positioned coaxially. The outer cylinder 2 is configured by, from top down, a gas guide cylinder 2c, the central outer cylinder 2a, a conical cylinder 2d, and a particle vent tube 2e. Particularly, the central outer cylinder 2a is formed so as to surround a part 10a in which the plurality of long holes 4 of the inner cylinder 10 are formed. It is preferred that the central outer cylinder 2a further extend downward from the bottom plate 11 of the inner cylinder 10.

In the present embodiment, the inner diameter D1 of the central outer cylinder 2a is preferably 1.1×D3 to 5×D3, where D3 is the outer diameter of the inner cylinder 10. Specifically, D1 is preferably 1.1×D3 to 3×D3. Considering reducing the residence time, it is preferred that D1 be reduced as much as possible on the basis of the radial direction protruding length P of each guide blade 5. It is also preferred that the height La of the central outer cylinder 2a be 0.8 to 10 times the inner diameter D3 of the inner cylinder 10. Considering reducing the residence time, it is preferred that La be reduced on the basis of the vertical length of each long hole 4. Specifically, La is preferably 1 to 5 times as large as D3.

On the central outer cylinder 2a is disposed the cylindrical gas guide cylinder 2c having a smaller diameter than the central outer cylinder 2a, and a gas vent port 6 is formed at two opposing positions on a side surface of the gas guide cylinder 2c. Gas vent tubes 7 communicated with the outside and extending in the radial direction are connected with the gas vent ports 6, respectively. The gas vent tubes 7 may be inclined upward or downward.

On the other hand, the conical cylinder 2d tapering downward and the small diameter particle vent tube 2e are connected in this order with a lower end of the central outer cylinder 2a. The particles are discharged from a particle vent port 3 provided at a lower end of the particle vent tube 2e. The gas is not constantly discharged from the particle vent port 3 of the particle vent tube 2e but is discharged constantly only through the gas vent tubes 7. The outer cylinder 2 and the inner cylinder 10 are communicated with each other via the long holes 4 only. The opening size of the particle vent port 3 of the particle vent tube 2e is preferably 0.6 to 2 times the outer diameter D3 of the inner cylinder 10.

Each of the above components is formed from an appropriate material that withstands chemical reactions. For example, stainless steel is an appropriate material as it is excellent in workability and has good chemical resistance. Moreover, different materials may be combined appropriately to configure each component. The important thing is that it is only necessary to use a material having necessary rigidity and resistance characteristics.

Next, the operations of the present embodiment are described. The mixture of gas and solid particles is fed from a mixture feed port 1 provided in the upper part of the gas-solid separator, downward to the inner cylinder 10 at a predetermined velocity. Although not particularly limited, examples of the solid particles include a fluid contact catalyst (FCC) that has an average particle diameter of approximately 1 to 500 μm and a particle bulk density of 0.6 to 0.9 g/cm$^3$.

The lower end part of the inner cylinder 10 is sealed by the bottom plate 11, with which some of the solid particles directly collide only immediately after starting to feed. Consequently, a solid particle bed (catalyst bed) is gradually formed and thereby the bottom plate is protected from collision/impact of the solid particles.

Figure 2:
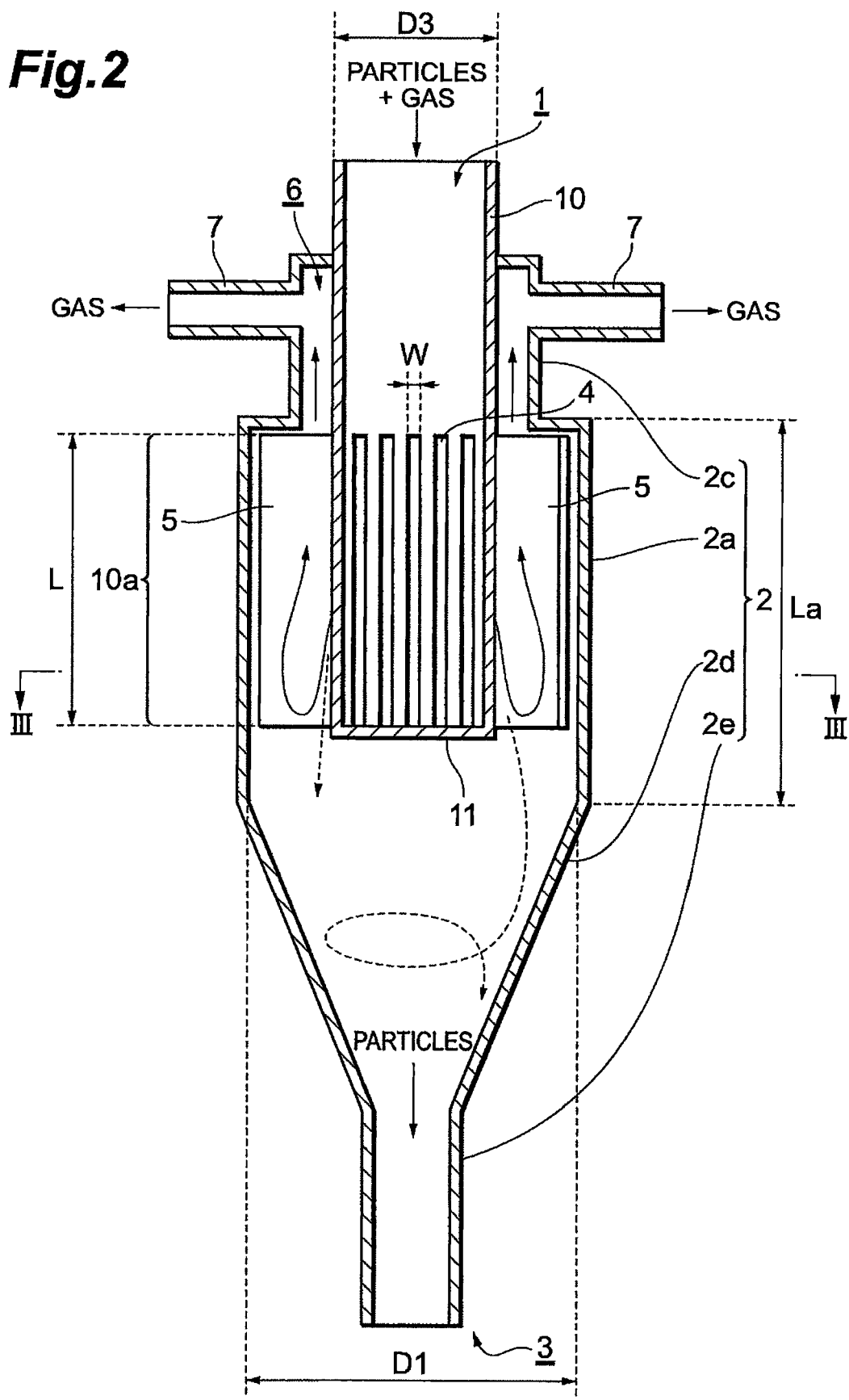
FIG. 2 is a longitudinal sectional view of the gas-solid separator shown in FIG. 1.

The mixture that constantly flows from the top to the bottom of the diagrams is interrupted through the bottom plate and the particle bed, which gives a lateral (horizontal direction) velocity to the flow of the mixture. The mixture then spurts out laterally downward from the plurality of holes (slits: 4) provided on the side surface of the inner cylinder 10, as shown in FIGS. 2 and 4. Here, the solid arrows show the flow of the gas, and the dashed arrows the flow of the solid particles.

Thereafter, as shown in FIG. 4, the gas flows downward out of the long holes 4, is guided to inner surfaces 5a by the guide blades 5 and slightly swirled clockwise as viewed from the top of the vertical axis in the diagram. Thereafter, the gas rises clockwise along an outer surface 5b of an adjacent guide blade 5 and is thereafter discharged from the gas vent ports 6.

Some of the solid particles, on the other hand, collide with the inner surfaces 5a of the guide blades 5 and directly move downward along the inner surfaces. Most of the rest of the particles leave the flow of the gas and directly proceed downward because the velocity of these particles is not inverted along with the gas due to their inertia or deadweight when the flow of the gas is inverted from the downward direction to the upward direction. Then, these particles are swirled along the inner surface of the conical cylinder 2d and discharged from the particle vent port 3, as shown in FIG. 2.

In this manner, the mixture of gas and solid particles is separated into gas and solid particles.

In addition, according to the invention of the present application, particularly the concaved part 10b that is concaved in the center direction of the inner cylinder is formed between the long holes 4 of the inner cylinder 10. Because the horizontal cross-sectional area is increased between the outer cylinder 2 and the section of the inner cylinder 10 where the velocity of the gas is inverted from downward to upward, the ascent velocity of the gas is reduced. Therefore, the number of solid particles flowing with the rising gas can be reduced easily, so that the separation efficiency can be improved.

Note that the additional factors affecting the separation efficiency include the particle diameter, the particle density, and the density difference between the gas and particles. The greater these factors are, the higher the separation efficiency becomes.

Second Embodiment

Figure 6:
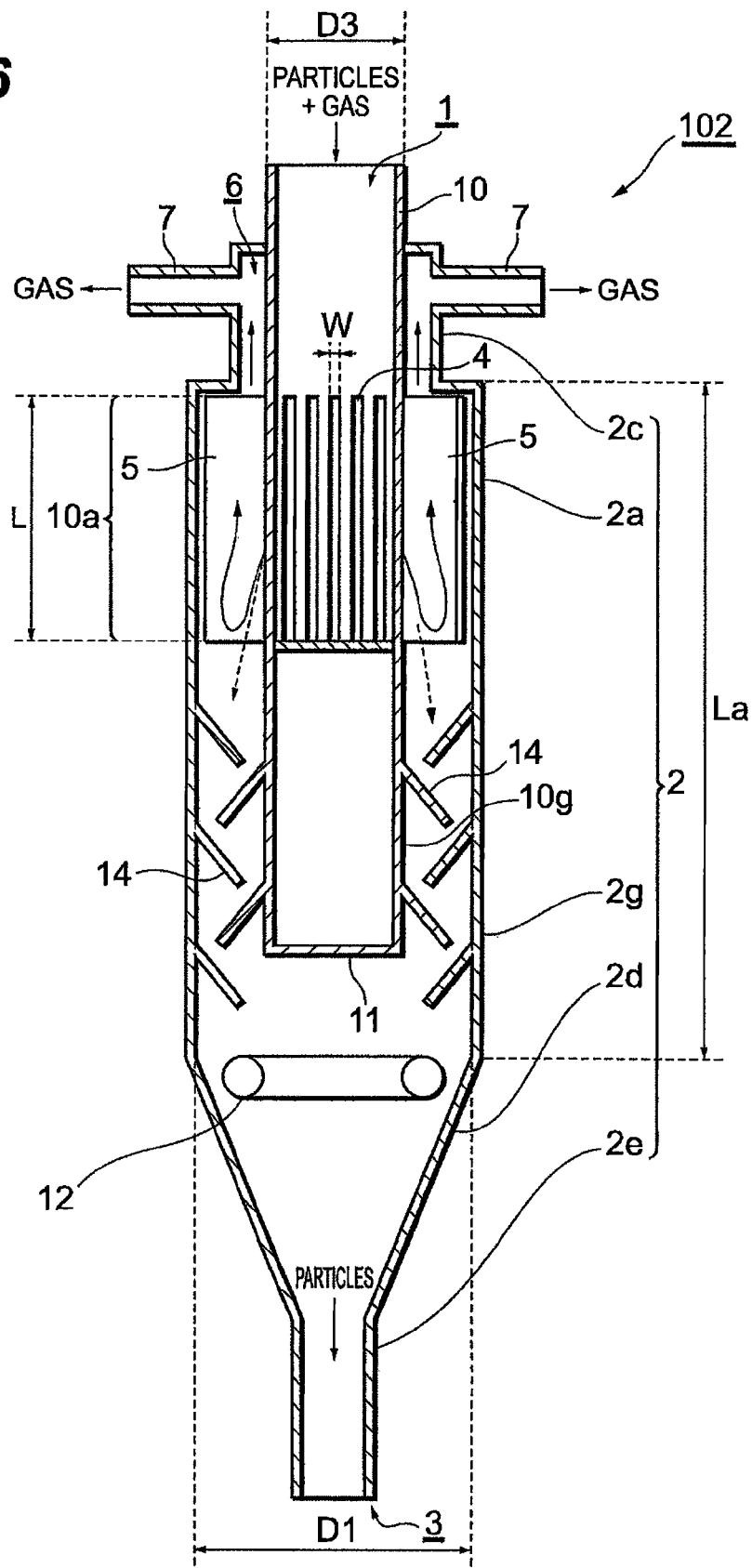
FIG. 6 is a longitudinal cross-sectional view of a gas-solid separator according to a second embodiment.

Next, the second embodiment is descried with reference to FIG. 6. When using the present gas-solid separator in the fluid catalytic cracking unit that produces gasoline using heavy oil as stock oil, the catalyst discharged from the particle vent port 3 has gas between the particles, and the heavy oil is adhered to the particles. Therefore, the catalyst is normally supplied from the particle vent port 3 to an unshown stripping device and then they are removed by inert gas, such as steam.

The gas-solid separator of the present embodiment is different from that of the first embodiment in that a pre-stripping mechanism 13 is incorporated in the lower part of the gas-solid separator so that pre-stripping can be performed in the lower part of the outer cylinder 2.

Specifically, a lower part of the central outer cylinder 2a is further provided with an outer cylinder 2g, and a plurality of stages of baffles 14 are provided on the inner surface. Moreover, an inner cylinder 10g extends below the bottom plate 11 of the inner cylinder 10, and the plurality of stages of the baffles 14 are provided to a circumferential surface of the inner cylinder 10g as well. In addition, annular steam supply means 12 is provided within the outer cylinder 2g and a lower part of the inner cylinder 10g. The particle vent port 3 is connected below the pre-stripping device 13 of the outer cylinder 2g.

The solid particles extracted from the particle vent port 3 are fed into a stripping device that is not shown.

In this gas-solid separator, the solid particles that are separated in an upper part of the outer cylinder 2 are dropped while being dispersed by the baffles 14 and then subjected to pre-stripping by the steam supplied from the steam supply means 12. Gas, oil vapor, stripping steam or the like generated from the pre-stripping device 13 is not discharged from the pre-stripping device to the outside the system but is directly fed into the gas-solid separator. In this manner, the pre-stripping effect can be improved and power-saving of the equipment can be achieved. Note that a decrease in the separation efficiency is hardly confirmed even when the pre-stripping mechanism is fed.

Note that the present embodiment uses the type of pre-stripping mechanism (device) that disperses the solid particles using the baffles 14 provided on the surfaces of the outer cylinder 2g and of the inner cylinder 10, but not only this mechanism but also a mechanism equivalent to a type of pre-stripping device that uses a perforated tray (perforated board) or a dense fluidized bed can be adopted.

EXAMPLE

Example

The gas-solid separator shown in FIGS. 1 to 4 having the following conditions was used to simulate separation of air of a temperature of 20° C. which contains solid particles having a particle diameter of 60 μm and a particle bulk density of 0.7 g/cm$^3$. The size and conditions of the gas-solid separator are shown in FIG. 7. Note that each guide blade has a quarter-circular cross-sectional shape, while the concaved part has a semicircular cross-sectional shape. The concaved part and the guide blade are integrated into an S-shape. Catalyst collection efficiency (unit: %)=(Weight of solid substance extracted from solid-substance vent port)/(Weight of catalyst supplied to separator).

Comparative Example

Other than the fact that the concaved parts were not formed in the inner cylinder, the same calculation example as the calculation example 1 was used. The collection efficiency was improved by the concaved parts.

The invention claimed is:
1. A gas-solid separator, comprising:
an inner cylinder having a closed lower end and an opened upper end, and extending in a vertical direction; and
an outer cylinder that coaxially covers the inner cylinder from the outside and has a gas vent port formed on the upper end side and communicating with an exterior,
wherein a plurality of axially extending long holes are formed on a side surface on the lower end side of the inner cylinder in a circumferential direction,
one of long side edge parts of each of the long holes is provided with a guide blade that protrudes outward and is inclined circumferentially so as to cover the long hole, and
a part between the long holes of the inner cylinder is concaved in a center direction of the inner cylinder.

2. The gas-solid separator according to claim 1, wherein the concaved part is formed along at least 50% of the vertical length of the long holes.

3. The gas-solid separator according to claim 1, wherein the concaved part is formed at least on the lower side between the long holes.

4. The gas-solid separator according to claim 1, wherein the concaved part has an arcuate cross-section as viewed in an axial direction of the inner cylinder.

* * * * *